United States Patent [19]

Adachi et al.

[11] Patent Number: 4,468,555

[45] Date of Patent: Aug. 28, 1984

[54] ELECTRIC SOLDERING IRON HAVING A PTC HEATING ELEMENT

[75] Inventors: Shichiro Adachi; Sho Kotani, both of Tokyo, Japan

[73] Assignee: TDK Corporation, Japan

[21] Appl. No.: 296,444

[22] Filed: Aug. 26, 1981

[30] Foreign Application Priority Data

| Aug. 31, 1980 | [JP] | Japan | 55-123819[U] |
| Aug. 31, 1980 | [JP] | Japan | 55-123820[U] |
| Aug. 31, 1980 | [JP] | Japan | 55-123821[U] |
| Sep. 3, 1980 | [JP] | Japan | 55-125150[U] |
| Apr. 3, 1981 | [JP] | Japan | 56-48123[U] |
| May 7, 1981 | [JP] | Japan | 56-66055[U] |

[51] Int. Cl.³ ............ B23K 3/02; H01C 7/02; H05B 3/14
[52] U.S. Cl. ................... 219/237; 219/238; 219/241; 219/505; 228/51; 338/22 R
[58] Field of Search .......... 219/241, 236–239, 219/504, 505, 227, 229; 228/51–55; 338/22 R, 23

[56] References Cited

U.S. PATENT DOCUMENTS

| 973,592 | 10/1910 | Van Aller | 219/237 X |
| 1,106,476 | 8/1914 | Royce | 219/239 |
| 1,353,965 | 9/1920 | Kuhn et al. | 219/238 X |
| 1,370,136 | 3/1921 | Lightfoot | 219/239 |
| 3,518,407 | 6/1970 | Andrich | 219/241 X |
| 3,584,190 | 6/1971 | Marcoux | 219/241 X |
| 4,096,098 | 6/1978 | Umeya et al. | 252/520 |
| 4,097,718 | 6/1978 | Weise | 219/241 X |
| 4,147,927 | 4/1979 | Pirotte | 219/540 X |
| 4,151,401 | 4/1979 | Van Bokestal et al. | 219/505 X |

FOREIGN PATENT DOCUMENTS

| 878917 | 11/1942 | France | 219/238 |
| 79681 | 2/1919 | Switzerland | 219/238 |
| 2064396 | 6/1981 | United Kingdom | 219/237 |

OTHER PUBLICATIONS

"PTC Thermistors as Self-regulating Heating Elements", by E. Andrich, Philips Technical Review, vol. 30, 1969, No. 6/7, pp. 170–177.

Primary Examiner—A. Bartis
Attorney, Agent, or Firm—Martin Novack

[57] ABSTRACT

A soldering iron is heated by an electric resistance heating element comprising a PTC thermistor having a positive temperature coefficient. The soldering iron has an elongated bit of copper with a cone shaped bit tip and a cylindrical back portion coupled with said bit tip. The back portion has a pair of arms and a slit between the arms for accepting the heating element with spring contact whereby the arms operate not only to transfer the heat to the tip, but also to fix the heating element in the slit tightly. The PTC thermistor is made mainly of Barium-titanate and has the additive of a small amount of calcium for improving the withstand voltage of the thermistor so that a commercial power supply can supply the power directly to the soldering iron. The total contact area $S_1$ between the PTC thermistor and the back body being from 1.0 cm² to 25 cm² and the transverse cross sectional area $S_2$ of the back body which contacts the thermistor being from 0.1 cm² to 3.0 cm².

6 Claims, 26 Drawing Figures

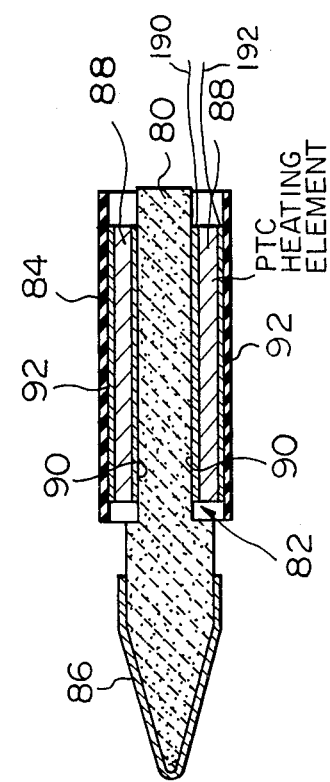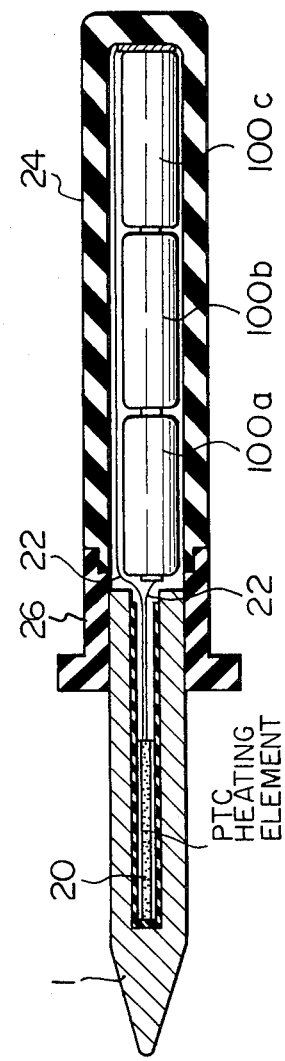
Fig. 14
Fig. 15

ELECTRIC SOLDERING IRON HAVING A PTC HEATING ELEMENT

BACKGROUND OF THE INVENTION

The present invention relates to a soldering iron, in particular relates to such a device which uses a heater made of a thermistor like Barium-titanate group ceramics, which has a positive temperature coefficient of resistance and larger resistance at high temperature. That heater is abbreviated as PTC.

A prior soldering iron is shown in FIG. 1, in which a bit 1A made of copper is surrounded by a heater made of Nichrome 2A. Alternatively, a Nichrome heater 2B is inserted within a bit 1B as shown in FIG. 2. Nichrome has the negative temperature coefficient, that is to say, the electrical resistance of a Nichrome heater is lower at a high temperature.

Accordingly, a prior soldering iron using a Nichrome heater has the disadvantage that an iron is excessively heated. The too high temperature of a soldering iron provides for the deterioration of a Nichrome heater itself, an insulation component, and even the deterioration of a component to be soldered.

In order to prevent over-heating, an operator must sometimes switch off a soldering iron, and then, the working efficiency of an operator is decreased.

Another prior soldering iron has a temperature control system for preventing an over-heating condition, by utilizing a temperature sensor and an automatic switching system. However, that temperature controlled soldering iron has the disadvantage that the structure is complicated, and the manufacturing cost of a soldering iron is high.

Further, when the heat capacity of a component to be soldered is large, or a high temperature is required, a soldering iron must generate much heat, and thus, consumes much power. Further, when a requested temperature is low, the bit is easily cooled although the heat capacity of the soldering iron is small. Therefore, when soldering continuously, the bit can become cooled and the soldering performance is deteriorated. And, moreover, a prior small soldering iron has the disadvantage that it takes a long time to reach the desirable temperature.

SUMMARY OF THE INVENTION

It is an object, therefore, of the present invention to overcome the disadvantages and limitations of a prior soldering iron by providing a new and improved soldering iron.

It is also an object of the present invention to provide a soldering iron which uses a PTC thermistor which has a positive temperature coefficient.

It is also an object of the present invention to provide a soldering iron which is quick in reaching the desired temperature, and is excellent in performance.

The above and other objects are attained by a soldering iron having an elongated bit with a cone shaped bit tip and an elongated back body having an empty region, a heater assembly mounted in said region of the bit, a lead wire coupled with said heater assembly to supply power to the soldering iron, a hand-grip coupled to the bit, said heater assembly comprising at least a PTC thermistor having a positive temperature coefficient of resistance, and a heat transfer element coupled to both said PTC thermistor and said elongated bit for transferring heat generated by the PTC thermistor to the bit tip.

The use of a PTC thermistor is a feature of the present invention. As the resistance of the PTC thermistor is higher at a high temperature, the power consumption at a high temperature is reduced, and the temperature of the bit tip is self-regulated by the nature of the PTC thermistor.

The presence of a heat transfer element between the bit and the PTC thermistor is also a feature of the present invention. The heat transfer element facilitates a quick transfer of the heat from the PTC thermistor to the bit tip, and the bit top is heated in a short time. Further, the quick transfer of the heat gets the PTC thermistor to generate more heat, since the PTC thermistor generates more heat when the temperature is low.

Preferably, the contact area $S_1$ between the PTC thermistor and the bit is in the range from 1.0 $cm^2$ to 25 $cm^2$, and the cross sectional area $S_2$ of a heat trasfer element together with the cross section area of the back body of the bit is in the range from 0.1 $cm^2$ to 3.0 $cm^2$. With those figures, the generation of the heat by the PTC thermistor, and the transfer of the heat to the bit tip are well balanced.

BRIEF DESCRIPTION OF THE DRAWINGS

The foregoing and other objects, features, and attendant advantages of the present invention will be appreciated as the same become better understood by means of the following description and accompanying drawings wherein FIG. 14 shows the structure of still another embodiment of the soldering iron according to the present invention, and FIG. 15 shows the structure of still another embodiment of the soldering iron according to the present invention.

DESCRIPTION OF THE PREFERRED EMBODIMENTS

Figure 1:
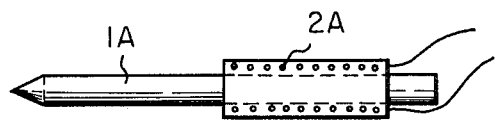
FIG. 1 shows a structure of a prior soldering iron.
Figure 2:
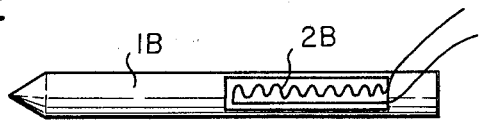
FIG. 2 shows a structure of another prior soldering iron.

Now, the first embodiment of the present soldering iron is described in accordance with FIGS. 3A, 3B, 3C and 3D. In those figures, the reference numeral 1 is a bit made of, for instance, copper or alloy of copper and iron. That bit 1 has a circular cross section with the circular cone at the extreme end of the same, and a back portion with a hollow region 1a at the other extreme end for accepting the heating assembly. The reference numeral 2 is a heating element of PTC thermistor, having a pair of plated electrodes 3a and 3b. The reference numerals 4 and 5 are electrode plates which touch with said electrodes 3a and 3b. The reference numeral 6 is an insulation layer made of, for instance, mica, Capton, or polyimide plastics.

The reference numerals 8 and 9 are heat transfer elements made of, for instance, copper, provided between the inner wall of the bit 1 and the heating element 2. The cross section of the heat transfer elements is half-circular so that they fill the gaps between the circular inner wall of the bit 1 and the planar heating element 2. It is preferable to press the bit 1 after the heating assembly including the heating element 2, the electrode plates 4 and 5, the insulation elements 6 and the heat transfer elements 7 and 8, are inserted in the hole so that said heat transfer elements 7 and 8 contact tightly with both the bit 1 and the heating element 2.

The presence of said heat transfer elements between the bit and an thermistor heating element is the important feature of the present invention. Said heat transfer elements 8 and 9 facilitate the transfer of the heat from the heating element 2 to the bit 1. Therefore, the temperature of the bit at the extreme end of the cone can reach quickly the desired soldering temperature, and the change of the temperature of the cone is quickly transferred to the heating element, which compensates said temperature change by generating new heat. Further, the presence of said heat transfer elements 8 and 9 facilitates the mechanical protection of the heating element 2 which is fragile.

Preferably, a liquid like grease is filled around said heat transfer elements 8 and 9 so that the heat coupling between the bit and the thermistor 2 is further improved.

Another feature of the present soldering iron is the use of a thermistor which has the positive temperature coefficient (PTC) as a heating element. That thermistor is, for instance, implemented by Barium-titanate, and the temperature characteristics of that thermistor depends upon the design of the Curie point at which the status of the crystal changes. That Curie point can be controlled by substituting some of Ba with Pb in Barium-titanate ($BaTiO_3$) to provide the Curie point higher than 120° C.

The PTC thermistor has the property that the electrical resistance becomes higher as the temperature increases considerably, and then, the power consumption and/or the heat generation is reduced. Thus, the present soldering iron has the capability of controlling its temperature automatically.

Because of the use of the PTC thermistor, the present soldering iron is free from over-heating, and is safe without utilizing a complicated temperature control system including a temperature sensor. Further, when the soldering iron is heated, the power consumption is reduced considerably due to the property of PTC. The power consumption of the present soldering iron after being heated is only one-fourth or one-fifth of a prior soldering iron which uses a Nichrome heater. Further, a PTC heater has the property that the power consumption at a low temperature is very large since the electrical resistance at a low temperature is small, so we can reach the desired temperature very quickly, and can have the constant temeperature of a bit even when we carry out many soldering operations.

Figure 3A:
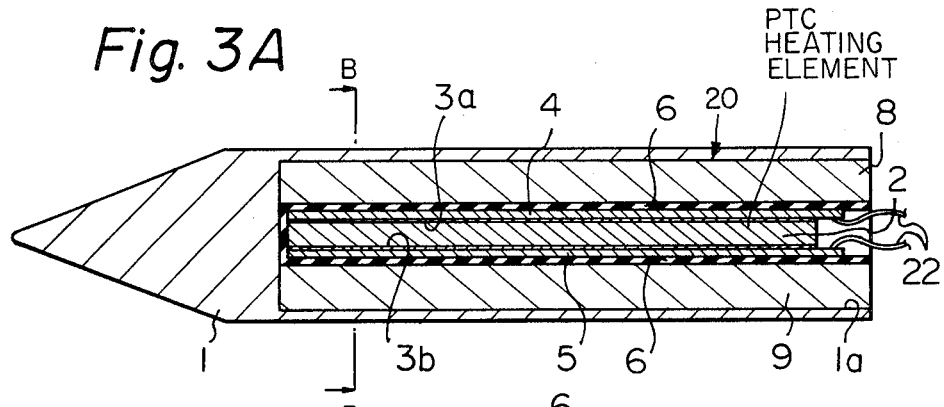
FIG. 3A is a cross section of a bit assembly of a soldering iron according to the present invention.
Figure 3B:
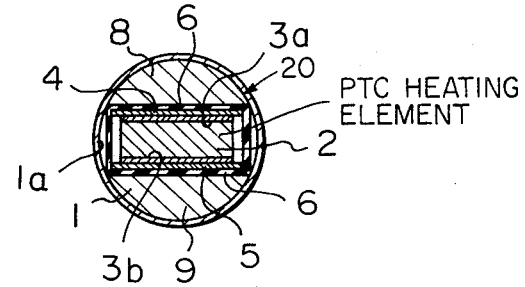
FIG. 3B is a cross section at the line B—B of FIG. 3A.
Figure 3C:
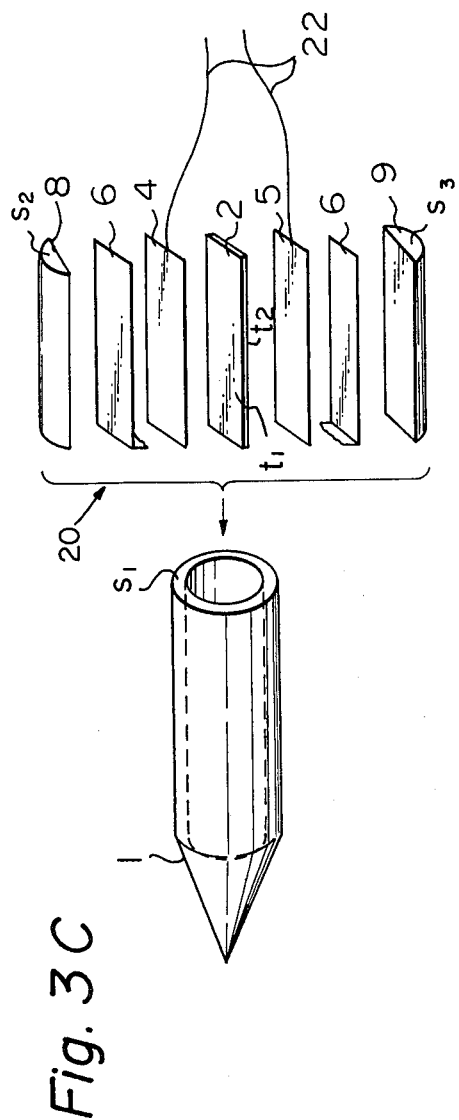
FIG. 3C is the disassembled view of a bit of FIG. 3A.
Figure 3D:
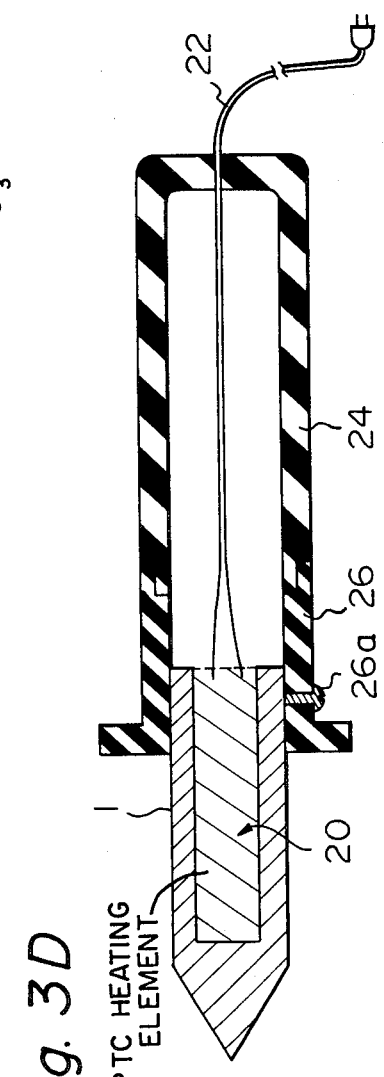
FIG. 3D is the cross section of the assembled soldering iron of FIGS. 3A, 3B and 3C.

FIG. 3C shows the disassembled view of the present soldering iron, and FIG. 3D shows the assembled view. The heater assembly 20 has the PTC thermistor 2 with plated electrode layers 3a and 3b, a pair of electrode plates 4 and 5 connected to the lead wire 22 for supplying the power, insulation layers 6 for providing the electrical insulation between the bit 1 and the thermistor 2, and a pair of heat transfer elements 8 and 9. That heater assembly 20 is inserted in the hollow region of the bit 1, then, the bit 1 is pressed so that the bit 1 holds the heater assembly 20 tightly and provides excellent heat transfer from the thermistor 2 to the bit 1.

The bit 1 together with the heater assembly 20 are fixed to the hand-grip 24 through the connector 26 which has a heat insulation property. That bit 1 is fixed to the connector 26 by using a screw 26a.

Preferably, when the bit 1 and the heat transfer element are made of copper, the area $S_1$ of the thermistor 2 contacting the heat transfer elements is in the range from 1.0 $cm^2$ to 25 $cm^2$. That area $S_1$ is substantially the sum of the area $t_1$ of the first plane, and the area $t_2$ of the second plane of the PTC thermistor (see FIG. 3C). If the area $S_1$ is less than 1 $cm^2$, the bit 1 can not be heated enough, and if that area $S_1$ is larger than 25 $cm^2$, it takes a long time to heat the bit 1 because the thermistor 2 is cooled so much through that wide area $S_1$.

Also, preferably, the area $S_2$ which transfers the heat to the tip of the bit 1 is in the range from 0.1 $cm^2$ to 3.0 $cm^2$. That area $S_2$ is composed of the cross sectional area $s_1$ of the hollow cylindrical wall of the bit 1, and the half-circular cross sectional areas $s_2$ and $s_3$ of the heat transfer elements 8 and 9. If that area $S_2$ is less than 0.1 $cm^2$, the heat transfer from the thermistor 2 to the tip of the bit 1 is insufficient and it takes a long time to reach the desired temperature. And, if that area $S_2$ is larger than 3.0 $cm^2$, it takes also a long time to reach the desired temperature, because the heat capacity of the soldering iron is too large, and the thermistor 2 is cooled excessively through that cross sectional area $S_2$.

Therefore, the area $S_1$ which is the contact area between the thermistor 2 and the bit 1 is in the range between 1.0 cm$^2$ and 25 cm$^2$, and the area $S_2$ which is the cross sectional area for the heat transfer from the thermistor 2 to the tip of the bit 1 is in the range from 0.1 cm$^2$ to 3.0 cm$^2$.

Figure 4:
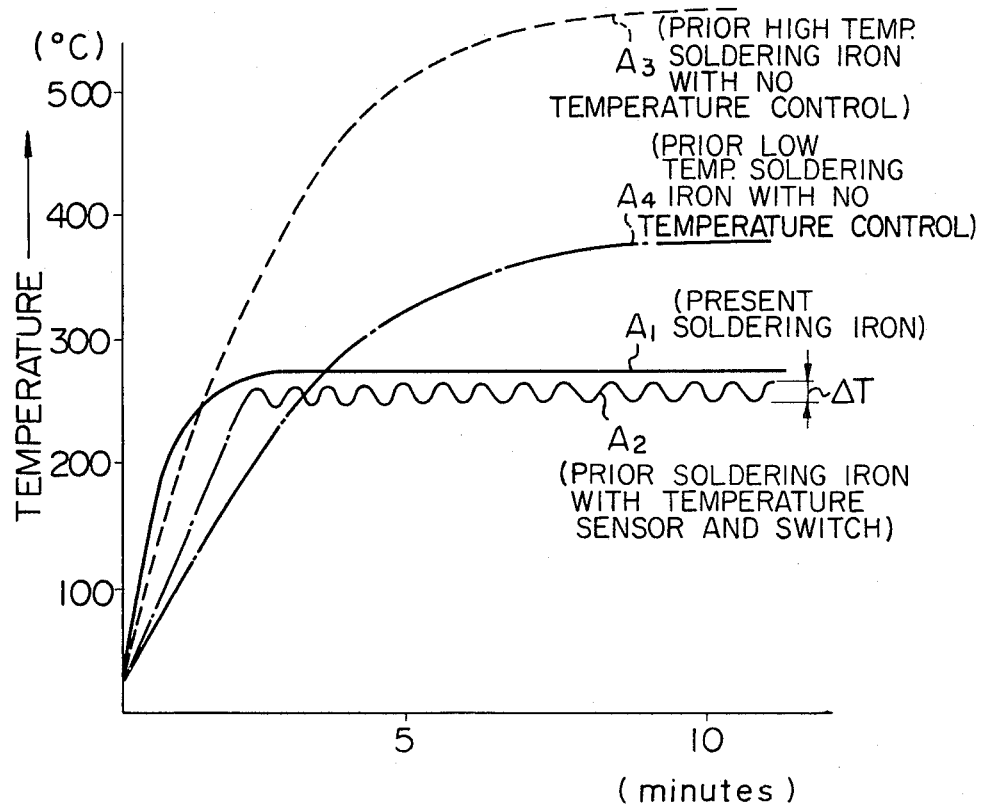
FIG. 4 shows curves of the temperature of a bit versus the heating time.
Figure 5:
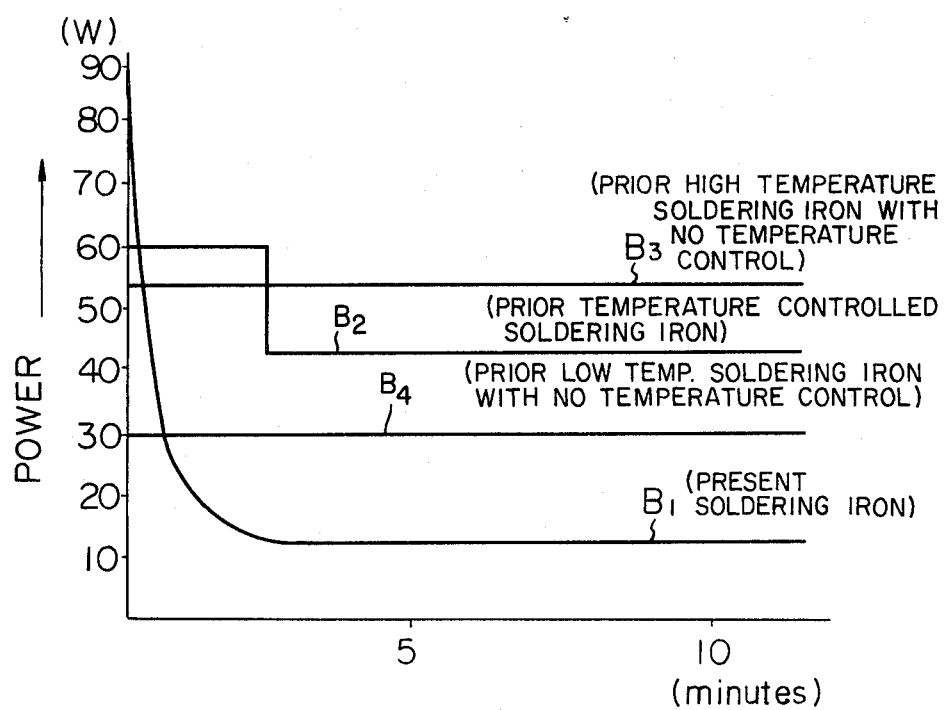
FIG. 5 shows curves of the consumed power versus heating time.
Figure 6:
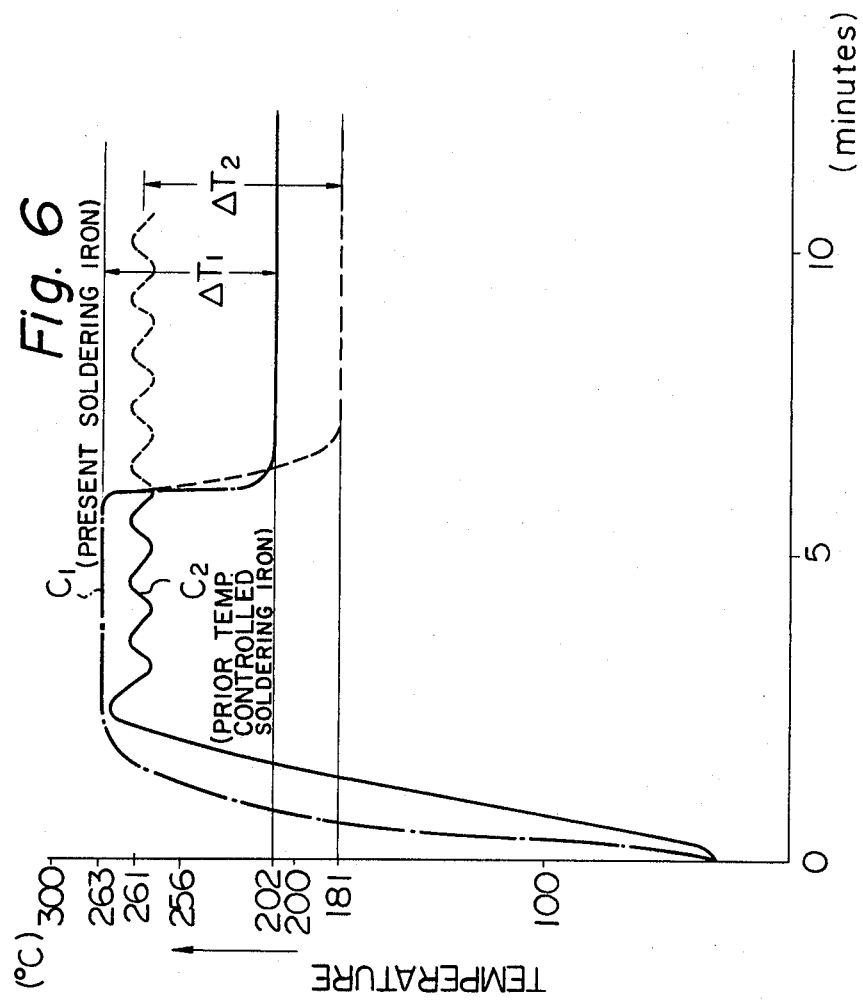
FIG. 6 shows the curves of the temperature of the soldering iron according to the present invention.

Now, the experimental result of the present soldering iron is described in accordance with FIGS. 4, 5 and 6.

FIG. 4 shows curves of the relationship between the heating time (horizontal axis) and the temperature of the bit. In FIG. 4, the curve $A_1$ shows the characteristics of the present soldering iron, the curve $A_2$ shows the characteristics of a prior soldering iron which has the temperature control system with a temperature sensor and a switch controlled by the sensor, the curve $A_3$ shows the characteristics of a prior high temperature soldering iron which has no temperature control system, and the curve $A_4$ shows the characteristics of a prior low temperature soldering iron which has no temperature control system. As shown in FIG. 4, prior soldering irons are heated higher than 350° C. when no temperature control system is provided as shown in the curves $A_3$ and $A_4$. On the other hand, according to the present invention, the present soldering iron is controlled automatically so that the temperature of the bit is less than 300° C. which is suitable for a soldering operation, as shown in the curve $A_1$. Thus, it should be appreciated that the present soldering iron is never over-heated. Further, a prior temperature controlled soldering iron has the small change of temperature ($\Delta T$) as shown in the curve $A_2$, because of the switching control (ON/OFF control). On the other hand, according to the present invention, that temperature change $\Delta T$ is almost zero due to the automatic power control by a PCT thermistor.

Further, it should be appreciated in FIG. 4 that the rising time of the curve up to the desired temperature is the shortest, that is to say, it takes only a short time to reach the desired temperature, and the temperature recovers in a short time after a soldering operation is performed. That short rising time comes from the low resistance of a PTC thermistor in a low temperature, and the presence of the heat transfer elements 8 and 9 for transferring the heat from the thermistor to the tip of the bit 1.

FIG. 5 presents curves showing the characteristics between the heating time in minutes (horizontal axis) and the power consumption in watts (vertical axis). The curve $B_1$ shows the characteristics of the present soldering iron, the curve $B_2$ shows the characteristics of a prior temperature controlled soldering iron, the curve $B_3$ shows the characteristics of a prior high temperature soldering iron which has no temperature control system, and the curve $B_4$ shows the characteristics of a prior low temperature soldering iron which has no temperature control system. As apparent from the curve $B_1$, according to the present invention, the initial current (or the initial power consumption) is very large, and that initial power which is consumed in the thermistor heater increases the temperature of the soldering iron quickly, then, due to the increase of the temperature of the thermistor heater, the resistance of the thermistor is increased, then, the power consumption in the thermistor is reduced in a short time. Therefore, as shown in FIG. 5, the power consumption is reduced to less than 10 watts within a minute after a power switch is turned ON. The power consumption after a minute is almost constant. That power consumption (less than 10 W) is only one-fourth or one-fifth of that of prior soldering irons of the curves $B_2$, $B_3$ and $B_4$.

FIG. 6 presents curves showing the temperature change of the tip of a bit, in which the horizontal axis shows the time in minutes, and the vertical axis shows the temperature in °C. The curve $C_1$ is the characteristics of the present soldering iron, and the curve $C_2$ is the characteristics of the prior temperature controlled soldering iron (the sample is W60, 260° C. type soldering iron (AC100 volts, 234 ohms) manufactured by Weller Co.). In obtaining the curves of FIG. 6, a soldering operation is used continuously, and the temperature of the tip of the bit is measured. According to the prior soldering iron (the curve $C_2$), the temperature of the tip of the bit is 261° C. when no soldering operation is performed, and that temperature is reduced to 181° C. by performing soldering operations, therefore, the temperature change due to the soldering operation is $\Delta T_2$ is 80° C. ($=261-181$). On the other hand, according to the present soldering iron, the temperature when no operation is performed is 263° C., and that temperature is reduced to 202° C. by performing the soldering operations. Therefore, the temperature change $\Delta T_1$ by the soldering operations is $\Delta T_1$ is 61° C. ($=263-202$). Accordingly, the temperature change of the present soldering iron is far smaller than that of the prior soldering iron, and then, the working condition of the soldering is improved, and a more excellent soldering product is obtained.

Figure 7:
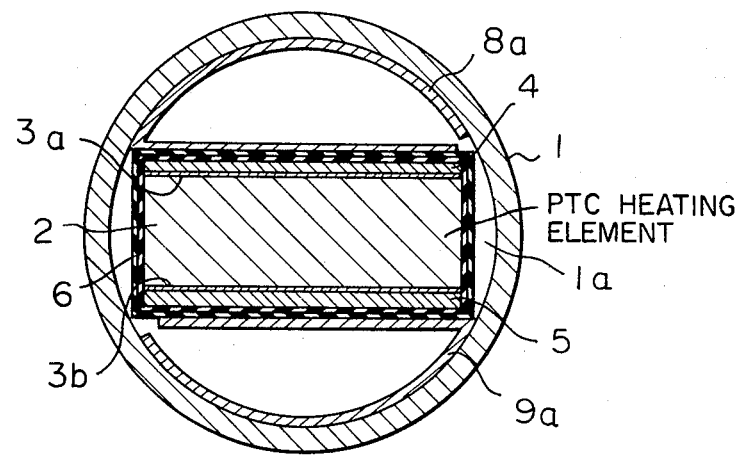
FIG. 7 shows the cross section of another embodiment of a soldering iron according to the present invention.

FIG. 7 is the modification of the present soldering iron of FIGS. 3A through 3D. The feature of the embodiment of FIG. 7 as compared with that of FIG. 3B is the presence of resilient heat transfer elements 8a and 9a, while those heat transfer elements 8 and 9 in FIG. 3B are bulk. Due to the use of resilient members 8a and 9a, the heat transfer from the thermistor 2 to the bit 1 through those heat transfer elements is further improved.

As described above, the present soldering iron has at least the features that the heater is a PTC thremistor, and that a heat transfer element is provided between the heater and the bit. That heat transfer element is important in the present invention, because a PTC thermistor provides much heat at a low temperature, and the more the heat is dissipated, the more the heat is generated, due to the nature of a PTC thermistor. The particular effects of the present soldering iron are (1) the temperature is automatically controlled due to the nature of a PTC thermistor, (2) the heat coupling between the heater and the bit is excellent, and the temperature change during the soldering operation is small, (3) the structure is simple because no particular temperature control system is used, (4) the power consumption is small, and (5) the manufacturing process is simple.

Figures 8A, 8B:
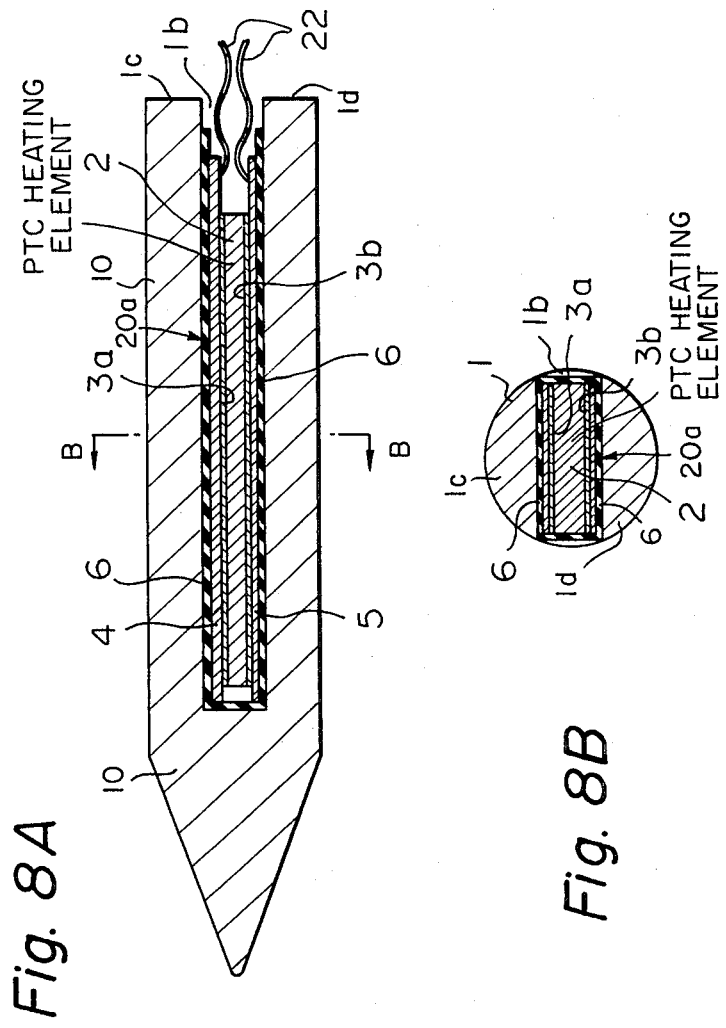
FIG. 8A shows a cross section of another bit assembly of a soldering iron according to the present invention.
FIG. 8B is a cross section at the line B—B of FIG. 8A.
Figure 8C:
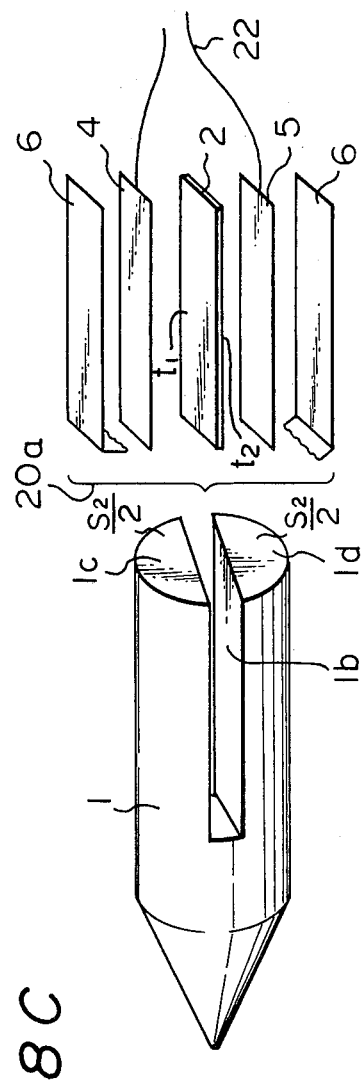
FIG. 8C is the disassembled view of a bit of FIG. 8A.
Figure 8D:
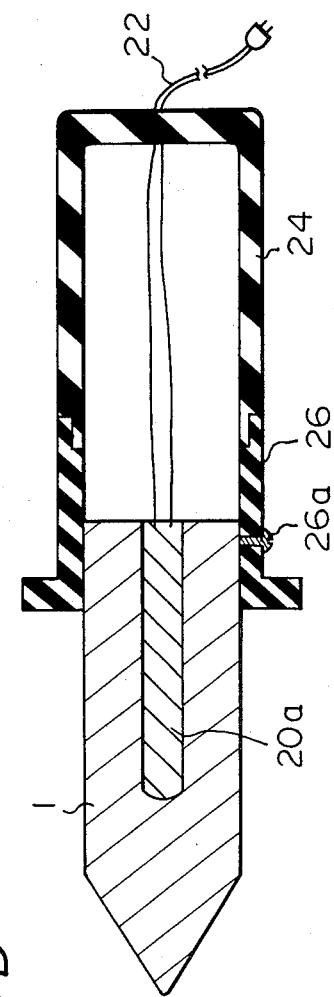
FIG. 8D is the cross section of the assembled soldering iron of FIGS. 8A, 8B and 8C.

Now, the second embodiment of the present soldering iron is described in accordance with FIGS. 8A, 8B, 8C and 8D. The feature of this embodiment resides in the structure of the bit 10, which has a cone shaped tip and a cylindrical body with a pair of arms with the elongated slit 1b between the arms. The cylindrical portion of the bit 10 has a pair of half circular arms 1c and 1d each facing with the slit 1b, and said half circular arms 1c and 1d operate as heat transfer elements. The heater assembly 20a has a PTC thermistor heater 2 with the plated electrical layers 3a and 3b on the surfaces of the same, the electrode plates 4 and 5 contacted with said PTC heater 2 through the electrode layers 3a and 3b, and a pair of insulation plates 6. A lead wire 22 is coupled to the electrode plates 4 and 5 for the purpose of power supply. The heater assembly 20a is inserted in the slit 1b of the bit 10, and the half circular arms 1c and 1d are pressed so that said arms hold the heater assembly tightly. The press of the half circular arms 1c and 1d provides the excellent heat contact between the heater assembly 20a and the bit 10. FIG. 8D shows the assembled view of the present soldering iron, in which the bit 10 together with the heater assembly 20a is fixed to the hand-grip 24 through the connector 26 with the screw 26a. In the embodiment of FIGS. 8A through 8D, the area $S_1$ which is the sum of the area $t_1$ and area $t_2$ for contacting the PTC thermistor 2 with the bit 10 is in the range from 1.0 cm$^2$ to 25 cm$^2$ and the area $S_2$ which is the sum of the cross section of the half circular arms 1c and 1d of the bit 10 is in the range from 0.1 cm$^2$ to 3.0 cm$^2$ (see FIG. 8C). Those numerical conditions are the same as those of the embodiment of FIGS. 3A through 3D.

The embodiment of FIGS. 8A through 8D has the effect that the heat contact from the thermistor 2 to the bit 10 is improved, together with the effects obtained by the embodiment of FIGS. 3A through 3D.

Figure 9:
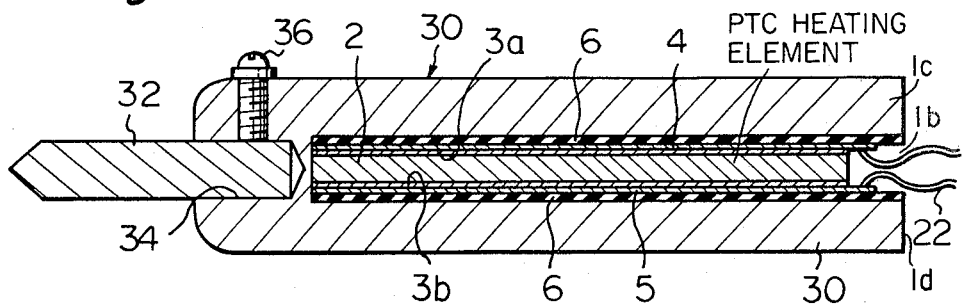
FIG. 9 shows a cross section of still another embodiment of the present invention.

FIG. 9 shows the modification of the embodiment of FIGS. 8A through 8D, and the feature of the embodiment of FIG. 9 is the removable bit tip 32, which can be separated from the heat transfer block 30. That heat transfer block 30 has a hole 34, in which the bit tip 32 is secured with the screw 36. The embodiment of FIG. 9 has the effect that the bit tip 32 is replaceable when the same is deteriorated. The other structure of FIG. 9 is the same as that of the embodiment of FIGS. 8A through 8D. It should be appreciated that the changeable bit tip is also applicable to the embodiment of FIGS. 3A through 3D.

Figure 10A:
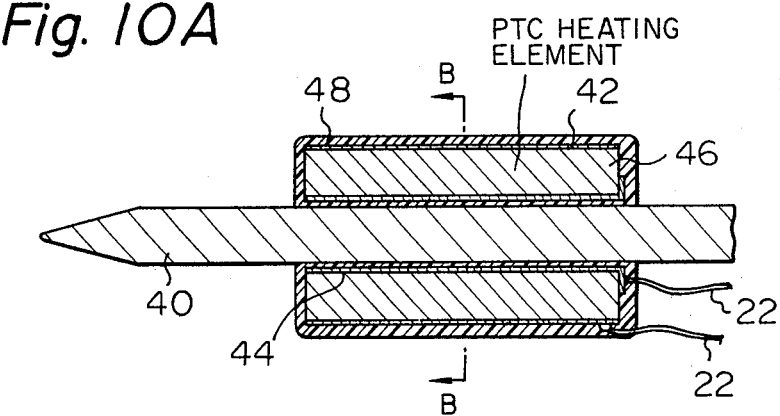
FIG. 10A is a cross section of still another soldering iron according to the present invention.
Figure 10B:
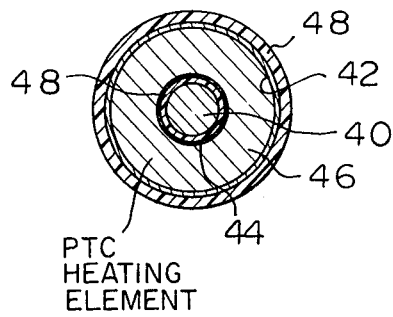
FIG. 10B is the cross section at the line B—B of FIG. 10A.

FIGS. 10A and 10B show another embodiment of the present soldering iron, in which FIG. 10A shows a vertical cross sectional view, and FIG. 10B is the cross section at the line A—A of FIG. 10A. The feature of the embodiment of FIGS. 10A and 10B is the use of cylindrical PTC thermistor 46, while the PTC thermistor in the previous embodiments is a flat plate. In FIGS. 10A and 10B, the reference numeral 40 is an elongated bit of copper with the cone shaped tip. The reference numeral 46 is a cylindrical PTC thermistor with a center hole for accepting the bit 40. The inner surface and the outer surface of the PTC thermistor 46 are plated with conductive layers 42 and 46 which operate as electrodes for supplying the power to the PTC thermistor 46. The insulation layer 48 is provided for the insulation between the bit and the PTC thermistor, and the insulation between the PTC thermistor and an external body. The power supply is applied between the inner surface and the outer surface of the cylindrical PTC thermistor.

Figure 11:
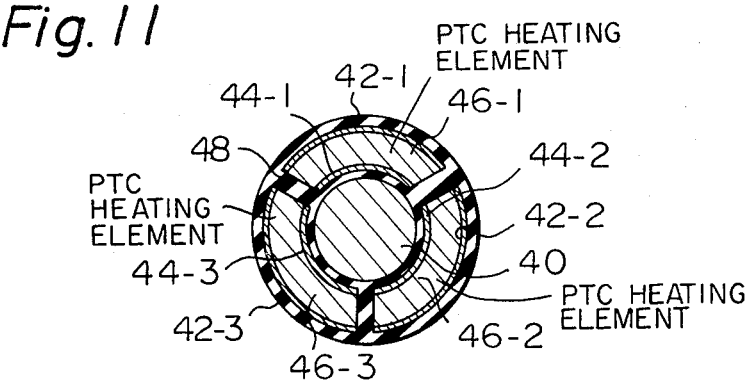
FIG. 11 is the cross section of still another embodiment of a soldering iron according to the present invention.

FIG. 11 is the modification of the embodiment of FIGS. 10A and 10B, and the features of FIG. 11 are the separated PTC thermistors 46-1, 46-2 and 46-3, which are individually supplied the power. As shown in FIG. 11, the cross section of each PTC thermistor is secter shaped, and those PTC thermistors conform a cylindrical body as a whole. The first PTC thermistor 46-1 is supplied the power through the electrodes 42-1 and 44-1, the second PTC thermistor 46-2 is supplied through the electrodes 42-2 and 44-2, and the third PTC thermistor 46-3 is supplied through the electrodes 42-3 and 44-3. Since each PTC thermistor is supplied individually, the power capacity of the soldering iron of FIG. 11 can be controllable by selecting one, two or three PTC thermistors. The selection of the PTC thermistors is performed according to the heat dissipation of the component to be soldered.

In the embodiments of FIGS. 10A, 10B and 11, preferably, the numerical conditions of the area $S_1$ and $S_2$ described previously are also satisfied. In this case, the area $S_1$ is the sum of the area of the inner surface and the outer surface of the cylindrical PTC thermistor, and that area $S_1$ is in the range from 1.0 cm$^2$ to 25 cm$^2$.

Now, other embodiments which have two PTC thermistors are described in accordance with FIGS. 12A and 12B, and FIGS. 13A through 13D.

Figure 12A:
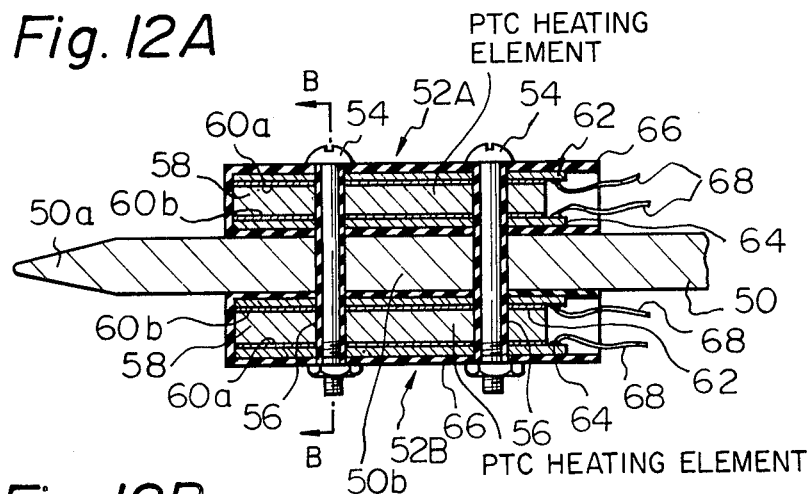
FIG. 12A is the cross section of still another embodiment of a soldering iron according to the present invention.
Figure 12B:
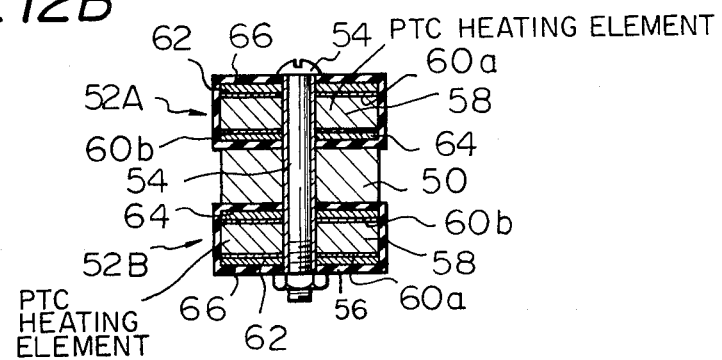
FIG. 12B is the cross section at the line B—B of FIG. 12B.

In FIGS. 12A and 12B, the bit 50 has the cone shaped bit tip 50a and the elongated plane portion 50b. On both sides of that plane portion 50b, a pair of heater assemblies 52A and 52B are fixed by means of nuts and bolts 54. Said bolts are covered with the insulation sleeves 56 for providing the insulation between the conductive bolts and the heater assemblies.

Each of the heater assemblies 52A and 52B have the plane PTC thermistor plate 58 which is plated with the conductive electrode layers 60a and 60b, a pair of electrode plates 62 and 64, and the insulation cover 66 covering the heater assembly. The lead wires 58 are connected to the electrode plates 62 and 64.

The structure of FIGS. 12A and 12B has the advantage that the assembling process is very simple, since the heater assemblies can be fixed to the bit 50 merely by nuts and bolts.

It is preferable that the area $S_1$ that is the sum of the areas that each PTC thermistor contacts with the bit is in the range from 1.0 cm$^2$ to 25 cm$^2$, and the area $S_2$ that the heat is transferred to the tip of the bit is in the range from 0.1 cm$^2$ to 3.0 cm$^2$. That area $S_2$ is the cross sectional area of the plane portion 50b of the bit 50 in this embodiment.

Figure 13A:
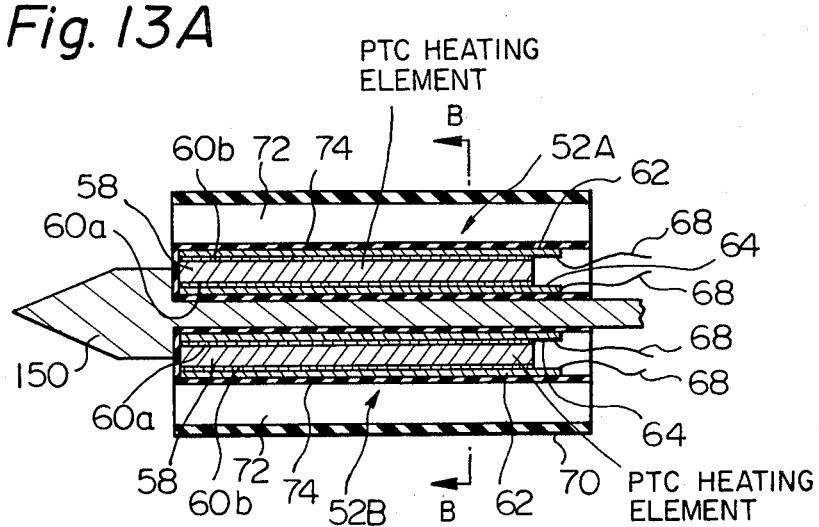
FIG. 13A is the cross section of still another embodiment of the soldering iron according to the present invention.
Figure 13B:
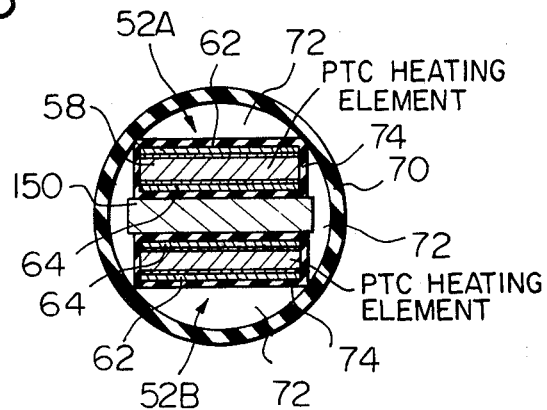
FIG. 13B is the cross section at the line B—B of FIG. 13A.
Figure 13C:
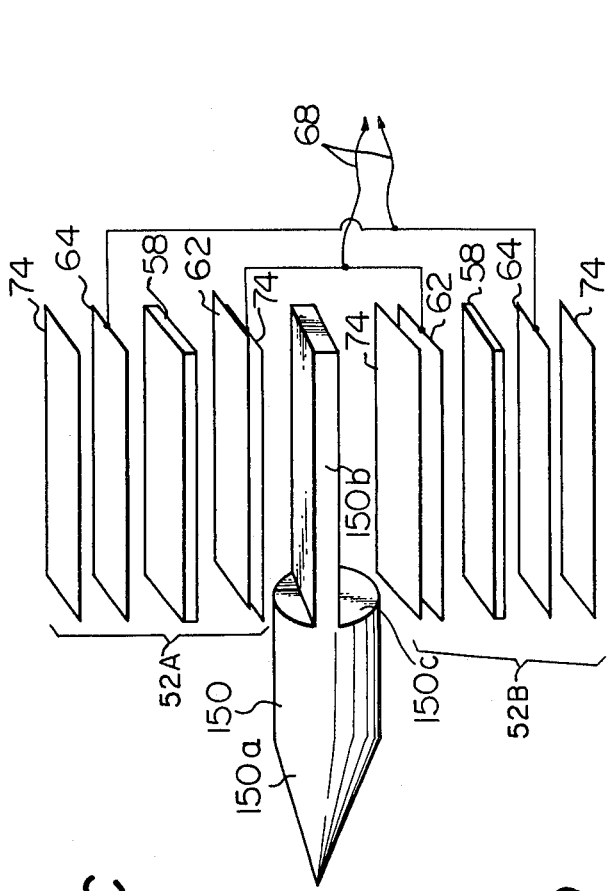
FIG. 13C is the disassembled view of the soldering iron of FIGS. 13A and 13B.
Figure 13D:
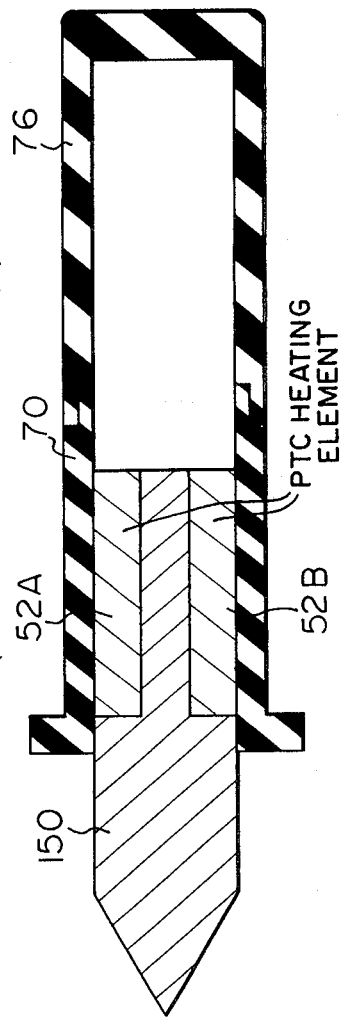
FIG. 13D is the assembled view of the soldering iron of FIG. 13C.

FIGS. 13A through 13D show the modification of the embodiment of FIGS. 12A and 12B. In this embodiment, FIG. 13A is the vertical cross sectional view, FIG. 13B is the cross sectional view at the line A—A of FIG. 13A, FIG. 13C is the disassembled view, and FIG. 13D is the cross section of the assembled soldering iron.

In FIGS. 13A through 13D, the bit 150 has the cone shaped bit tip 150a and the elongated plane portion 150b. There is provided a sudden step 150c at the border between the bit tip 150a and the plane portion 150b. A pair of heater assemblies 52A and 52B are attached in the areas provided on the plane portion 150b of the bit 50. Those heater assemblies 52A and 52B, and the plane portion 150b of the bit 150 are covered with the cylindrical insulation housing 70. That cylindrical housing 70 provides the spring contact between the heater assemblies and the bit 150. Each of the heater assemblies 52A and 52B has the plane PTC thermistor heater plated with the electrode layers 60a and 60b, a pair of electrode plates 62 and 64, and the insulation plates 74. It should be appreciated that the empty area 72 is provided between the inner wall of the cylindrical housing 70 and the heater assemblies 52A and 52B. That empty area 72 which is filled with air, operates as the heat insulator, and therefore, the heat dissipation from the PTC thermistor to the housing is restricted, and the heat of the PTC thermistor is transferred to the bit top with high efficiency. The reference numeral 76 is a hand-grip coupled with the cylindrical housing 70.

It is preferable also in the embodiment of FIGS. 13A through 13D that the relationships of the area $S_1$ and $S_2$ are satisfied. That is to say, the area $S_1$ which is the sum of the contact area of the PTC thermistors and the bit is in the range from 1.0 cm² to 25 cm², and the area $S_2$ which is the cross sectional area of the plane portion 150b, which transfers the heat from the PTC thermistor to the bit tip is in the range from 0.1 cm² to 3.0 cm².

FIG. 14 shows still another embodiment of the soldering iron according to the present invention. In the figure, the bit 80 is made of dielectric material like Al₂O₃, and/or MgO, which has good heat conductivity. That bit 80 has the cone shaped bit tip and the elongated back portion. The cylindrical heater assembly 82 is coupled with that back portion of the bit. The conductive bit cover 86 is attached on the bit tip so that melted solder can get on the bit tip. The preferable material of that cover 86 is chrome or nickel, which are deposited on the bit tip through a plating process or a sputterring process or through an evaporation process. The heater assembly 82 has the hollow cylindrical PTC thermistor 88 with the cylindrical inner electrode 90 and the cylindrical outer electrode 92, and the cylindrical housing 84 covering the heater assembly. The lead wires, 190 and 192, are connected to the electrodes 90 and 92. It should be noted that there is no insulation means between the heater assembly and the bit, since that insulation means is unnecessary as the bit itself is dielectric. The structure of FIG. 14 is very simple and has the advantage that no leak occurs to the bit tip.

FIG. 15 shows still another embodiment of the present soldering iron, in which the heater assembly is energized by batteries mounted in a hand-grip. In the figure, the reference numeral 1 is the bit, 20 is the heater assembly, 22 is the lead wire, 24 is the hand-grip, 26 is the connector for coupling the heater assembly with the hand-grip. As shown in the figure, the hand-grip 24 has a plurality of batteries connected in series one after another. Therefore, the soldering iron of FIG. 15 is used without supplying the power from an external power supply through a wire.

The PTC thermistor utilized in the present soldering iron is composed mainly of Barium-titanate, with some Lead-titanate included in that Barium-titanate. Further, the addition of a small amount of Mn, SiO₂ and/or Ca to Barium-titanate, or the composition of Barium-titanate and Lead-titanate improves the characteristics of the PTC thermistor. In our experiment, the addition of a small amount of Mn improves the ratio $R_{max}/R_{min}$, where $R_{max}$ is the maximum specific resistance at high temperature of the thermistor, and $R_{min}$ is the minimum specific resistance at low temperature. The addition of a small amount of Ca improves the withstand voltage of a thermistor. Therefore, by adding some Ca, the soldering iron which is supplied directly from the commercial power supply can be obtained. When the soldering iron is supplied by a battery, the addition of Ca is not necessary. The property of a thermistor with each component is shown in our U.S. Pat. No. 4,096,098.

As described above in detail, the present soldering iron which is heated by a PTC thermistor, has the advantages that the temperature is automatically regulated due to the property of a PTC thermistor, the heat efficiency is excellent because of the presence of a heat transfer element for transferring the heat from the PTC thermistor to the bit top, and the particular numerical combination of $S_1$ and $S_2$. And, further, the present soldering iron can be powered either by a commercial power supply (AC 100 volts to AC 220 volts) or a battery, by selecting the suitable composition of a PTC thermistor.

From the foregoing it will now be apparent that a new and improved soldering iron has been invented. It should be understood of course that the embodiments disclosed are merely illustrative and are not intended to limit the scope of the invention. Reference should be made to the appended claims, therefore, rather than the specification as indicating the scope of the invention.

What is claimed is:

1. A soldering iron comprising:
   an elongated bit with a cone shaped bit tip and an elongated cylindrically-shaped back body having an empty region;
   a heater assembly mounted in said region of the bit and thermally contacting the back body in said empty region;
   a lead wire coupled with said heater assembly to supply power to the soldering iron;
   a hand-grip coupled with the bit;
   said heater assembly comprising a PTC thermistor having a positive temperature coefficient of resistance as a heater;
   the total contact area $S_1$ between said PTC thermistor and said back body being in the range from 1.0 cm² to 25 cm², and the transverse cross sectional area $S_2$ of the back body which contacts said PTC thermistor being in the range from 0.1 cm² to 3.0 cm².

2. A soldering iron according to claim 1, wherein said region for accepting the heater assembly is provided by a slit provided between arms at the back body of the bit.

3. A soldering iron according to claim 1, wherein said heater assembly is of a flat shape and the empty region contacted by said heater assembly is also of a flat shape.

4. A soldering iron according to claim 1, wherein said bit is made of copper.

5. A soldering iron according to claim 1, wherein said bit is made of alloy of copper and iron.

6. A soldering iron according to claim 1, wherein said PTC thermistor is made of Barium-titanate with a small amount of calcium added.

* * * * *